(12) United States Patent
Huang et al.

(10) Patent No.: US 8,960,640 B2
(45) Date of Patent: Feb. 24, 2015

(54) FAST INTAKE VALVE

(75) Inventors: Hongbin Huang, Foshan (CN); Jiyue Yang, Foshan (CN)

(73) Assignee: Guangdong Liansu Technology Industrial Co., Ltd (CN)

( * ) Notice: Subject to any disclaimer, the term of this patent is extended or adjusted under 35 U.S.C. 154(b) by 298 days.

(21) Appl. No.: 13/514,320

(22) PCT Filed: Oct. 11, 2010

(86) PCT No.: PCT/CN2010/077637
§ 371 (c)(1),
(2), (4) Date: Jun. 7, 2012

(87) PCT Pub. No.: WO2011/150613
PCT Pub. Date: Dec. 8, 2011

(65) Prior Publication Data
US 2012/0241656 A1   Sep. 27, 2012

(30) Foreign Application Priority Data
Jun. 1, 2010 (CN) .......................... 2010 1 0193112

(51) Int. Cl.
*F16K 51/00* (2006.01)
*F16L 29/00* (2006.01)
*F16L 37/28* (2006.01)
*F16L 37/42* (2006.01)

(52) U.S. Cl.
CPC .............. *F16L 37/42* (2013.01); *F16L 29/007* (2013.01)
USPC ................................... 251/149.6; 251/149.9

(58) Field of Classification Search
CPC .......... F16L 37/34; F16L 37/42; F16L 37/32; F16L 29/02; F16L 37/40; F16L 29/00; F16L 37/28; F16K 51/00
USPC ............. 251/149, 149.1, 149.4, 149.6, 149.7, 251/149.9, 337; 137/512.1, 515, 515.5, 137/625.28, 599.02, 601.2; 285/27, 33
See application file for complete search history.

(56) References Cited

U.S. PATENT DOCUMENTS

| | | | | |
|---|---|---|---|---|
| 2,135,222 | A | * | 11/1938 | Scheiwer ................. 137/614.04 |
| 2,197,271 | A | * | 4/1940 | Kerrick .......................... 137/540 |
| 3,777,782 | A | * | 12/1973 | Shendure ................. 137/614.02 |
| 4,436,125 | A | | 3/1984 | Blenkush |
| 5,509,696 | A | * | 4/1996 | Smith et al. ....................... 285/27 |
| 5,546,985 | A | * | 8/1996 | Bartholomew .......... 137/614.04 |
| 7,686,033 | B2 | * | 3/2010 | Niki et al. ................. 137/543.23 |
| 7,686,037 | B2 | * | 3/2010 | Krywitsky ............... 137/614.04 |

FOREIGN PATENT DOCUMENTS

| | | |
|---|---|---|
| CN | 87202759 U | 1/1988 |
| CN | 1080702 A | 1/1994 |
| CN | 1092511 A | 9/1994 |
| WO | 2008130311 A1 | 10/2008 |

* cited by examiner

*Primary Examiner* — John K Fristoe, Jr.
*Assistant Examiner* — Hailey K Do
(74) *Attorney, Agent, or Firm* — Lerner, David, Littenberg, Krumholz & Mentlik, LLP

(57) ABSTRACT

The invention provides a fast intake valve that comprises an intake pipe, a middle connector, a rear connector, an intake pipe sealing ring, a receiving pipe, an intake sealing ring, a support frame and a spring. The invention has simple structure and can intake water rapidly and conveniently.

9 Claims, 5 Drawing Sheets

FAST INTAKE VALVE

CROSS-REFERENCE TO RELATED APPLICATIONS

The present application is a national phase entry under 35 U.S.C. §371 of International Application No. PCT/CN2010/077637 filed Oct. 11, 2010, published in English, which claims priority from Chinese Patent Application No. 201010193112.5 filed Jun. 1, 2010, all of which are incorporated herein by reference.

FIELD OF THE INVENTION

The present invention relates to irrigation apparatus used in areas of agriculture and forestry, and more particularly, to fast intake valves.

BACKGROUND OF THE INVENTION

Conventional watering devices used in grassy areas and gardens are generally directly connected to a faucet and the water is supplied by the faucet to the watering devices, which is very inconvenient. In recent years, a rapid intake valve is available in the market which comprises a check valve in the valve body and a quick-connect coupling. In use, the tubular shape of the quick-connect coupling is inserted into the valve body to push up an opening stem of the check valve and then the check valve is opened so as to communicate water inlet with water outlet, allowing the water to spray out. The rapid intake valve of this type is quick and simple in operation, and easy to use. However, a main question exits in that components of the valve, especially the mould of spring bracket used for spool resetting, have complicated structures which causes a low qualified rate of component molding. In addition, large amount of components leads to high manufacturing cost and cumbersome assembling, which is inconvenient in practical application.

SUMMARY OF THE INVENTION

An object of the invention is to overcome the deficiencies in prior art and provide an intake valve that has simple structure and can intake water rapidly and conveniently. In order to realize the above object, the invention employs the following technical scheme:
A fast intake valve comprises an intake pipe, a middle connector, a rear connector, an intake pipe sealing ring, a receiving pipe, an intake sealing ring, a support frame and a spring. The rear connector respectively muff-couples the middle connector and the receiving pipe to form a valve body. The support frame is arranged inside the valve body. As a spool, the support frame is connected with the spring to open or close the water passage of the valve body. The support frame is also provided with an intake sealing ring to form a sealing when the water passage of the valve body is closed. The intake pipe is connected with the middle connector in a plug-in way. An intake pipe sealing ring is provided between the intake pipe and the middle connector to form a sealing of the intake pipe and the middle connector. When the intake pipe is inserted into a proper position of the middle connector, the end of the intake pipe can push up the support frame to open the water passage of the valve body. The push-up structure in the end of the intake pipe is a curved surface body. The support frame is also provided with a curved surface body corresponding to the push-up structure.

The invention can achieve the following advantages:
1. The valve body comprises three components. That is, the rear connector respectively muff-couples the middle connector and the receiving pipe with a thread structure. The receiving pipe can be connected to a water source. Thus the middle connector only need to be simply connected to the intake pipe to allow water to flow through, which makes the integral structure simple, practical and reliable with a low manufacturing cost;
2. There is a general check valve with commonly used structure arranged inside the valve body. The support frame and the spring can form a spool. The end of the support frame that seals up the water passage can also act as the push-up end of the intake pipe, which further simplifies integral structure. In addition, the position where the intake pipe engage with the support frame is a curved surface structure, which makes the positioning precise, takes less power to push up, reduces the attrition effectively and makes the structure convenient and endurable.
3. All components that constitute the invention are in the same axis. With a specific arrangement of the water inlet, the water outlet passage can be at the central line of the water flow in the valve stem, which realize a spindle water outlet passage with low flow resistance.

DETAILED DESCRIPTION OF PREFERRED EMBODIMENTS

The invention is further described in reference to the drawings.

Figure 1:
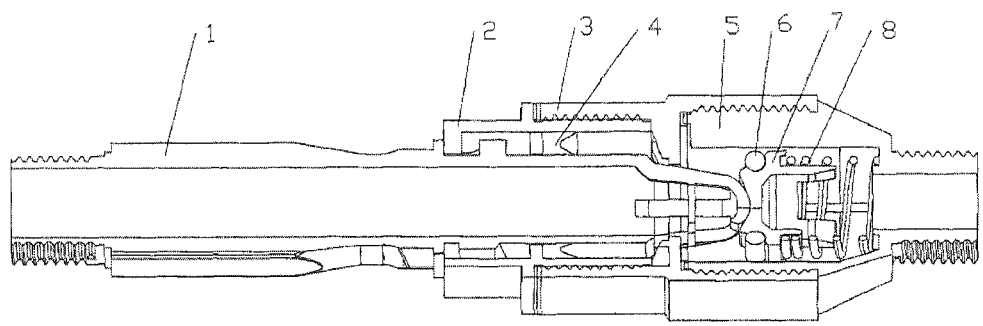
FIG. 1 is a schematic view of the structure of the invention.

Referring to FIG. 1 which shows the general structure of a fast intake valve comprising an intake pipe 1, a middle connector 2, a rear connector 3, an intake pipe sealing ring 4, a receiving pipe 5, an intake sealing ring 6, a support frame 7 and a spring 8, with all of these coaxially disposed.

Figure 2:
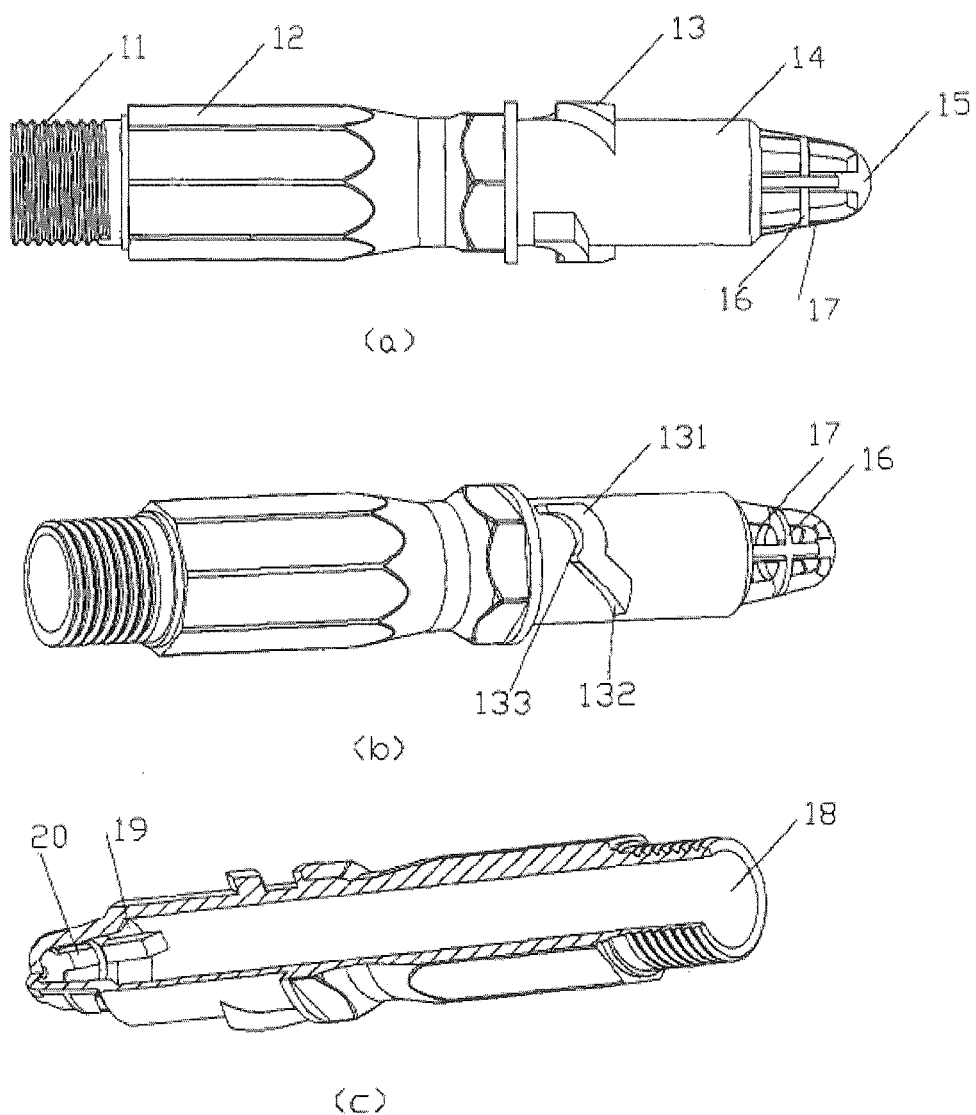
FIG. 2 is a schematic view of the structure of the intake pipe.

As shown in FIG. 2, the intake pipe 1 of the fast intake valve comprises a threaded connecting segment 11, a handling segment 12, a fixing bulge 13, a positioning segment 14, a support frame pushing bulge 15, an intake segment 17, an intake reinforcing ring 16, an inner straight tubular segment 18, a transitional conical segment 19 and an intake opening 20. All the segments are axisymmetric bodies and coaxially disposed. The threaded connecting segment 11 is arranged to connect with sprinkling pipes. The handling segment 12 facilitates manual operation of the intake pipe 1.

The fixing bulge 13 comprises a cylindrical surface 131, a precessing surface 132 that forms a certain angle with the intersecting surface of the intake pipe 1 and perpendicular to the positioning segment, and a fixing surface 133 that forms a certain angle with the intersecting surface of the intake pipe 1 and perpendicular to the positioning segment. The fixing bulge 13 is located at the outer surface of the positioning segment 14. The precessing surface 132 can be a surface that takes a spiral line as the base line and can also be a curved surface when unfolded. The precessing surface 132 is for the engagement with the precessing bulges 25 of the middle connector 2, allowing the intake pipe 1 to press down the support frame 7 along the axis when rotated.

The fixing surface 133 can be a surface that takes a spiral line as the base line and can also be a curved surface when unfolded. When the intake pipe 1 is rotated into the intake valve, the precessing bulges 25 of the middle connector 2 engage with the fixing surface, preventing the intake pipe 1 from being pushed out by the spring 8. The rotating direction of the precessing surface 132 is contrary to that of the fixing surface 133.

The positioning segment 14 has a cylindrical surface which is coupled to the inner surface of the intake pipe sealing ring 4, preventing water from leakaging through the outer surface of the intake pipe 1. The positioning segment 14 is coupled to the inner cylindrical surface of the positioning end 24 of the intake pipe sealing ring 4 in the middle connector 2, ensuring the intake pipe 1 be coaxial with the middle connector 2.

The intake segment 17 is a hollow conical segment with four intake openings 20 which are in a square or rectangular shape or other shapes. The intake reinforcing ring 16, which is perpendicular to the axis of the intake pipe 1, is arranged around the intake opening 20.

The support frame pushing bulge 15 is arranged at the end of the intake segment 17 and coupled to the pushing surface 73 of the support frame 7, pushing the support frame away from the sealing ring 33 of the rear connector 3. The support frame pushing bulge 15 can be a part of a spherical surface, or be any other curved surface structures such as a conical surface or a cylindrical surface. The transitional conical segment 19 is a hollow conical segment for connecting the inner straight tubular segment 18 and the intake segment 17.

Figure 3:
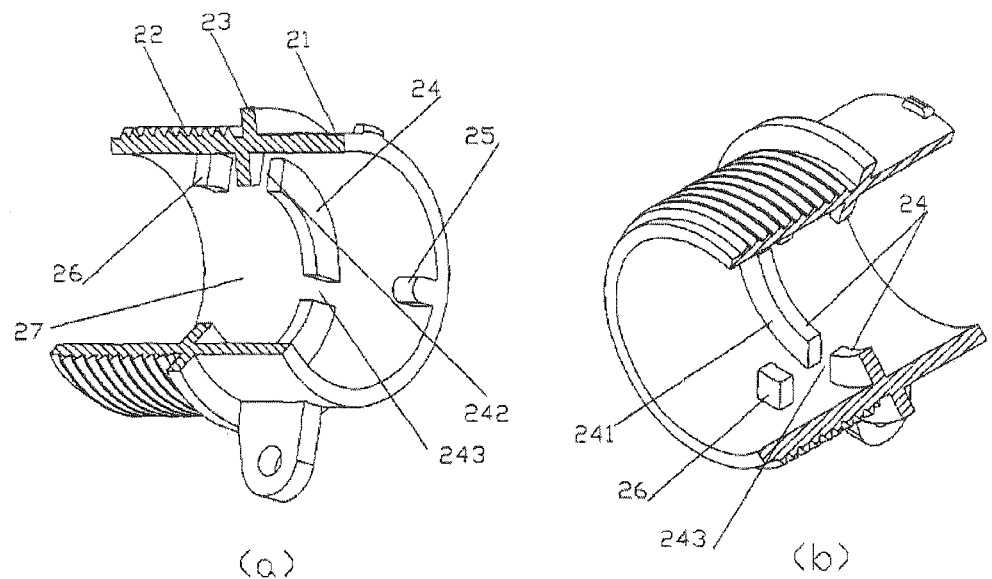
FIG. 3 is a schematic view of the structure of the middle connector.

As shown in FIG. 3, the middle connector 2 comprises a straight tubular segment 21, a threaded tubular segment 22, an outer cylindrical ring 23, the precessing bulges 25, a positioning inner cylindrical ring 24 of the intake pipe sealing ring 4, and positioning blocks 26 of the intake pipe sealing ring 4. The main part of the middle connector 2 is a straight pipe. The threaded tubular segment 22 is arranged to connect with the rear connector 3. The outer cylindrical ring 23 is arranged to determine the distance that the rear connector 3 precesses. The two uniformly distributed precessing bulges 25 are arranged to contact with the precessing surface 132 and the fixing surface 133 of the intake pipe 1, allowing the intake pipe 1 precesses into the middle connector 2 and then fixed therein.

The positioning inner cylindrical ring 24 is located at the inner surface 27 of the middle connector 2 and coaxial with the middle connector 2. The positioning blocks 26 comprise two uniformly distributed blocks that are located at the inner surface 27 of the middle connector 2 and arranged 90° with respect to the two uniformly distributed precessing bulges 25. The positioning inner cylindrical ring 24 is cut into four segments that are located certain distance from each other. That is, four gaps are formed in the positioning inner cylindrical ring 24 and the width of each gap is the same as or slightly larger than the axial width of the precessing bulges 25 and the positioning blocks 26 respectively, for the purpose of facilitating mould release during injection moulding and simplifying the injection mould.

Figure 4:
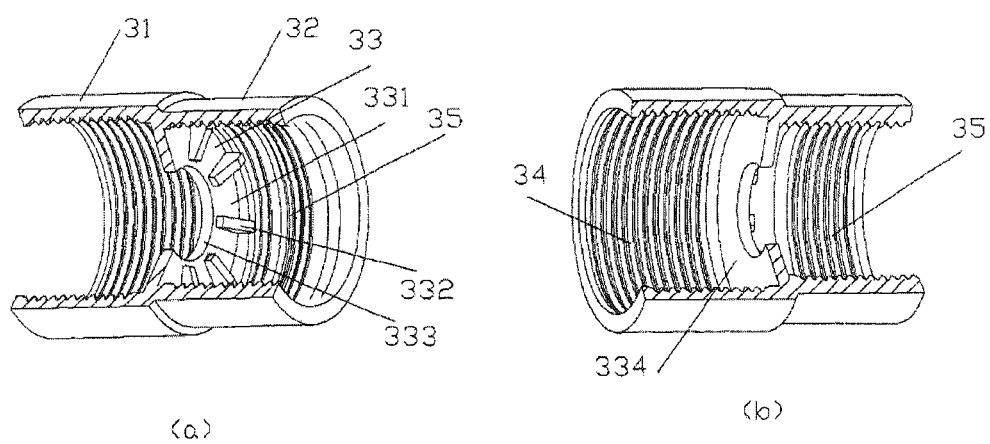
FIG. 4 is a schematic view of the structure of the rear connector.

As shown in FIG. 4, the rear connector 3 comprises two coaxial cylindrical pipes 31, 32, an inner end surface ring 33 and two inner threads 34, 35. The two inner threads 34, 35 are respectively connected with the threaded tubular segment 22 of the middle connector 2 and the outer threaded segment 53 of the receiving pipe 5. The inner end surface ring is perpendicular to the axis of the rear connector 3. A plurality of reinforcing ribs 332 are uniformly distributed on the upper end surface 331 of the inner end surface ring. The lower end surface 334 is arranged to be coupled with the sealing ring 6. When the sealing ring 6 is compressed tightly on the lower end surface 334, the water from the receiving pipe 5 is blocked, and when the sealing ring 6 is disengaged with the lower end surface 334 to a certain distance, the water from the receiving pipe 5 flows through the central opening 333 of the upper end surface 33 into the intake pipe 1.

Figure 5:
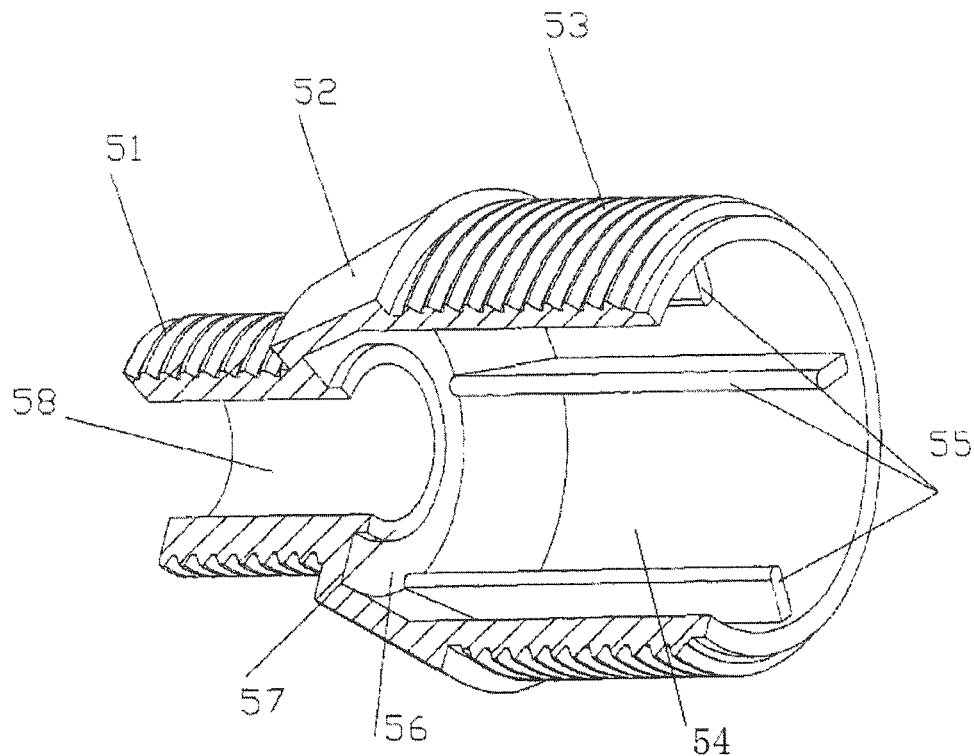
FIG. 5 is a schematic view of the structure of the receiving pipe.

As shown in FIG. 5, the receiving pipe 5 comprises a receiving outer thread 51, a conical tubular segment 52, an outer threaded segment 53 to be engaged with the rear connector 3, an inner cylindrical surface 54, a spring limiting baffle 55, a spring base 56, a spring limiting inner cylindrical ring 57 and an inner cylindrical surface 58, with all of these disposed coaxially.

The receiving outer thread 51 is arranged to connect with water source. The conical tubular segment 52 is arranged to connect the receiving outer thread 51 with the outer threaded segment 53 of the rear connector 3. The spring limiting baffle 55 comprises a plurality of flat plates that are uniformly distributed on the inner cylindrical surface 54 and in parallel with the axis of the receiving pipe, in order to limit radial displacement of the spring 8.

The spring base 56 is an annular end surface that perpendicular to the axis of receiving pipe 5. The spring limiting inner cylindrical ring 57 is a cylindrical ring that is conaxis with the receiving pipe 5. The spring limiting inner cylindrical ring 57 has the same inner diameter as the inner cylindrical surface 58 and limits the radial displacement of the spring 8 with the spring limiting baffle 55.

Figure 6:
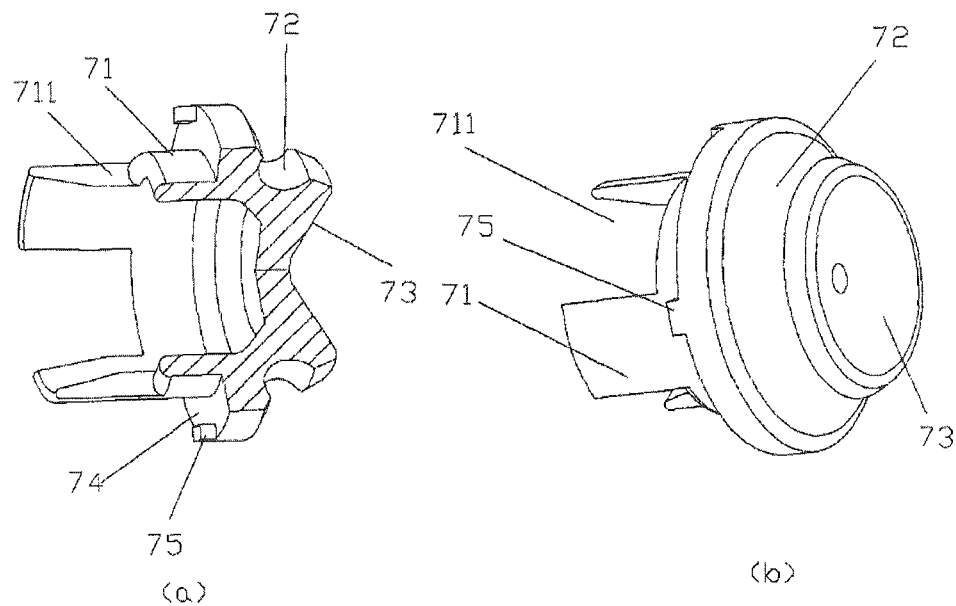
FIG. 6 is a schematic view of the structure of the support frame.

As shown in FIG. 6, the support frame 7 is an axisymmetric body that comprises a spring limiting cylindrical surface 71, a circular ring 72 for receiving the intake sealing ring 6, a pushing surface 73, an outer spring limiting block 75 and a spring flat base 74. A plurality of gaps are arranged on the spring limiting cylindrical surface 71, in order to direct the water from the receiving pipe 5 to the central opening 333 of the upper end surface 33 into the intake pipe 1. The outer limiting block 75 is constituted by a plurality of bulges that uniformly distributed on the spring flat base 74, limiting the radial displacement of the spring 8 with the spring limiting cylindrical surface 71.

The present invention works as follows. The receiving pipe 5 is connected with the water source through the receiving outer thread 51. When the intake pipe 1 is not inserted into the middle connector 2, the spring 8 applies a force on the support frame 7 to make the intake sealing ring 6 compress tightly on the lower end surface 333 of the rear connector 3. That is, the intake sealing ring 6 and the lower end surface 333 of the rear connector 3 form a sealing pair to block the water flow passage and prevent water from flowing into the middle connector 2.

Figure 7:
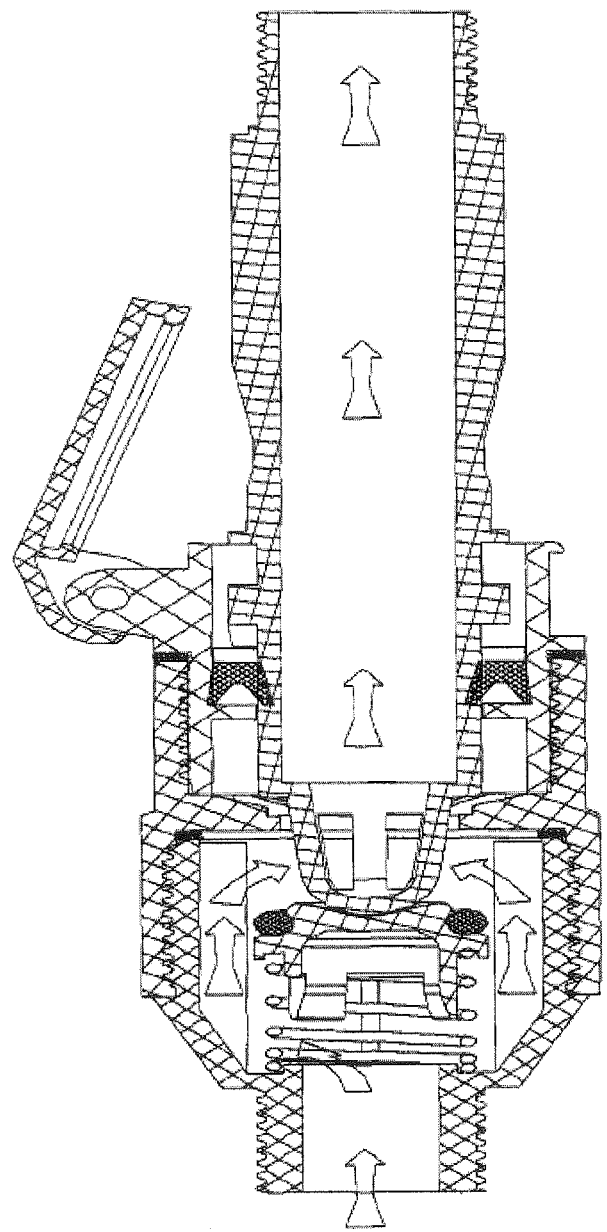
FIG. 7 is a schematic view of the water flow passage of the invention.

When it is necessary to get water from the water source, the intake pipe 1 is inserted into the middle connector 2, and the intake pipe 1 is pushed down and rotated so that the precessing surface 132 of the intake pipe 1 rotates around the precessing bulges 25 of the middle connector 2 and the pushing bulge 15 pushes the support frame 7 away from the lower end surface 333. By certain rotation, the precessing bulges 25 of the middle connector 2 fall into the fixing surface 133 of the intake pipe 1 and fixes the intake pipe 1 automatically. In the meanwhile, since the support frame 7 is pushed away and the intake sealing ring 6 is moved along with the support frame 7, water would flow through the gap of limiting cylindrical surface of the support frame 7 and the intake opening 20 of the intake pipe 1, into the intake pipe 1. As shown in FIG. 7, water flows in the direction of arrows.

What is claimed is:

1. A fast intake valve, comprising an intake pipe, a middle connector, a rear connector, an intake pipe sealing ring, a receiving pipe, an intake sealing ring, a support frame and a spring, wherein the rear connector is respectively engaged with the middle connector and the receiving pipe to form a valve body, the support frame is arranged inside the valve body and as a spool, the support frame is connected with the spring to open or close a water passage of the valve body, the support frame is also provided with the intake sealing ring to form a sealing when the water passage of the valve body is closed, the intake pipe is connected with the middle connector in a plug-in way, the intake pipe sealing ring is provided between the intake pipe and the middle connector to form a sealing therebetween, when the intake pipe is inserted into a predetermined position of the middle connector, an end of the intake pipe pushes up the support frame to open the water passage of the valve body, the end of the intake pipe has a pushing structure that assumes a curved surface body and the support frame is also provided with a curved surface body corresponding to the pushing structure.

2. The fast intake valve according to claim 1, characterized in that the intake pipe, the middle connector, the rear connector, the intake pipe sealing ring, the receiving pipe, the intake sealing ring, the support frame and the spring are disposed coaxially.

3. The fast intake valve according to claim 1, characterized in that a fixing structure is provided between the intake pipe and the middle connector to maintain the support frame in a pushed-up status.

4. The fast intake valve according to claim 3, characterized in that the intake pipe comprises in sequence a threaded connecting segment, a handling segment, a positioning segment, an intake segment, and a support frame pushing bulge, wherein all the segments are axisymmetric bodies and coaxially disposed, the support frame pushing bulge forms the pushing structure, the positioning segment is provided with a rotating fixing bulge, an inner straight tubular segment is arranged inside the intake pipe, the intake segment is a hollow conical segment that is connected with the inner straight tubular segment by an transitional conical segment, intake openings 20 are uniformly distributed on the intake segment and an intake strengthening ring 16, which is perpendicular to the axis of the intake pipe 1, is arranged around the intake openings.

5. The fast intake valve according to claim 4, characterized in that the rotating fixing bulge comprises a cylindrical surface, a precessing surface that forms a certain angle with the intersecting surface of the intake pipe and is perpendicular to the positioning segment, and a fixing surface that forms a certain angle with the intersecting surface of the intake pipe and is perpendicular to the positioning segment, wherein the precessing surface and the fixing surface are both surfaces that take a spiral line as the base line or unfolded curved surfaces, the rotating direction of the precessing surface being contrary to that of the fixing surface.

6. The fast intake valve according to claim 3, characterized in that the middle connector comprises a straight tubular segment, a threaded tubular segment, an outer cylindrical ring, precessing bulges, an inner cylindrical ring and positioning blocks, wherein the threaded tubular segment is arranged to connect with the rear connector and defines the distance from the rear connector by the outer cylindrical ring, the precessing bulges include two uniformly distributed bulges, the positioning inner cylindrical ring is located at the inner surface of the middle connector and coaxial with the middle connector, the positioning blocks comprise two uniformly distributed blocks that are located at the inner surface of the middle connector and form 90° with respect to the two uniformly distributed precessing bulges, the positioning inner cylindrical ring is cut into four segments that are located certain distance from each other, namely four gaps are arranged in the positioning inner cylindrical ring and the width of each gap is respectively the same as or slightly larger than the axial width of the precessing bulges and the positioning blocks.

7. The fast intake valve according to claim 3, characterized in that the rear connector comprises two coaxial cylindrical pipes, an inner end surface ring and two inner threads, wherein the two inner threads are respectively engaged with the outer thread arranged in the middle connector and the receiving pipe, the inner end surface ring being perpendicular to the axis of the rear connector, several reinforcing ribs being uniformly distributed on the upper end surface of the inner end surface ring, with the lower end surface of the inner end surface ring coupled to the intake sealing ring.

8. The fast intake valve according to claim 3, characterized in that the receiving pipe comprises a receiving outer thread, a conical tubular segment, an outer threaded segment that is connected with the rear connector, an inner cylindrical surface, a spring limit baffle, a spring base, a spring limiting inner cylindrical ring and an inner cylindrical surface, with all of which coaxially disposed, wherein the conical tubular segment is connected between the receiving outer thread with the outer threaded segment, the spring limiting baffle comprises a plurality of flat plates that are uniformly distributed on the inner cylindrical surface and in parallel with the axis of the receiving pipe, the spring base is an annular end surface that perpendicular to the axis of receiving pipe, the spring limiting inner cylindrical ring is a cylindrical ring that is coaxial with the receiving pipe and has the same inner diameter as the inner cylindrical surface.

9. The fast intake valve according to claim 3, characterized in that the support frame is an axisymmetric body that comprises a spring limiting cylindrical surface, a circular cross-section ring for receiving the intake sealing ring, an out-pushing surface, an outer spring limiting block and a spring flat base, wherein a plurality of gaps are arranged on the spring limiting cylindrical surface in order to direct the water from the receiving pipe to the rear connector and finally into the intake pipe, the outer limiting block comprising a plurality of bulges that are uniformly distributed on the spring flat base.

* * * * *